United States Patent [19]

LaZonby et al.

[11] Patent Number: 5,980,758
[45] Date of Patent: Nov. 9, 1999

[54] METHOD AND COMPOSITION FOR INHIBITING GROWTH OF MICROORGANISMS INCLUDING PERACETIC ACID AND A NON-OXIDIZING BIOCIDE

[75] Inventors: Judy G. LaZonby, Crystal Lake; Robert E. McCarthy, Naperville; Nancy L. Casselman, Wheaton, all of Ill.

[73] Assignee: Nalco Chemical Company, Naperville, Ill.

[21] Appl. No.: 09/094,947

[22] Filed: Jun. 15, 1998

Related U.S. Application Data

[63] Continuation-in-part of application No. 08/848,326, Apr. 30, 1997, Pat. No. 5,785,867, which is a continuation-in-part of application No. 08/559,685, Nov. 15, 1995, Pat. No. 5,658,467, which is a continuation-in-part of application No. 08/350,570, Dec. 7, 1994, Pat. No. 5,494,588, which is a continuation-in-part of application No. 08/102,286, Aug. 5, 1993, abandoned.

[51] Int. Cl.$^6$ ....................................................... C02F 1/50
[52] U.S. Cl. .......................... 210/754; 210/755; 210/759; 210/764; 210/928; 252/175; 252/180; 422/28; 422/37; 514/557
[58] Field of Search ..................................... 210/754, 755, 210/759, 764, 928; 252/175, 180; 422/28, 37; 514/557

[56] References Cited

U.S. PATENT DOCUMENTS

| 4,966,775 | 10/1990 | Donofrio et al. . | |
|---|---|---|---|
| 5,090,990 | 2/1992 | McCoy et al. | 71/67 |
| 5,200,189 | 4/1993 | Oakes et al. . | |
| 5,306,432 | 4/1994 | Puetz . | |
| 5,368,749 | 11/1994 | La Zonby . | |
| 5,393,781 | 2/1995 | Vegega et al. | 514/557 |
| 5,395,530 | 3/1995 | Robertson et al. . | |
| 5,494,588 | 2/1996 | LaZonby . | |
| 5,658,467 | 8/1997 | LaZonby et al. . | |

FOREIGN PATENT DOCUMENTS

WO 96/14092    5/1996    WIPO .

*Primary Examiner*—David A. Simmons
*Assistant Examiner*—Betsey J. Morrison
*Attorney, Agent, or Firm*—Kelly L. Cummings; Thomas M. Breininger

[57] ABSTRACT

The present invention provides a composition and method of administering same for inhibiting the growth of microorganisms. The composition of the present invention includes sufficient amounts of peracetic and a non-oxidizing biocide. The method of the present invention includes the step of adding sufficient amounts of peracetic acid and the non-oxidizing biocide to industrial process waters.

9 Claims, No Drawings

METHOD AND COMPOSITION FOR INHIBITING GROWTH OF MICROORGANISMS INCLUDING PERACETIC ACID AND A NON-OXIDIZING BIOCIDE

REFERENCE TO RELATED PATENT

This application is a continuation-in-part of U.S. Ser. No. 08/848,326, filed Apr. 30, 1997, (now U.S. Pat. No. 5,785,867), which is a continuation-in-part of U.S. Ser. No. 08/559,685, filed Nov. 15, 1995 (now U.S. Pat. No. 5,658,467), which is a continuation-in-part of U.S. Ser. No. 08/350,570, filed Dec. 7, 1994 (now U.S. Pat. No. 5,494,588), which is a continuation-in-part of U.S. Ser. No. 08/102,286, filed Aug. 5, 1993 (now abandoned), the disclosures of which are incorporated herein by reference.

FIELD OF THE INVENTION

The present invention relates generally to controlling the growth of microorganisms. More specifically, the present invention relates to inhibiting the growth of microorganisms in industrial waters.

BACKGROUND OF THE INVENTION

The presence of microorganisms in waters, especially industrial waters, is a never-ending concern for industrial manufacturers. Examples of industrial waters where microorganisms can interfere with industrial processes include: cooling tower waters, mining process waters, food processing waters, papermaking slurries, pulp and paper mill waters, sugar reprocessing waters, and the like.

In the paper industry, the growth of microorganisms in pulp and paper mill waters can adversely affect finished paper products. Microbial life depends on nutrients, pH and temperature of a particular system. The warm temperatures and rich carbohydrate containing fluids of paper machines and process streams provide ideal growth conditions for a variety of microorganisms. These contaminating microorganisms are capable of causing spoilage of pulp, furnish or chemical additives. The microorganisms cause deposits that break loose and fall into the paper furnish, resulting in quality loss and/or end product defects such as holes and spots. The end result is unsalable paper or paper sold at a lower value. Robertson, *The Use of Phase-Contrast Microscopy to Assess and Differentiate the Microbial Population of a Paper Mill*, TAPPI Journal, pp. 83 (March 1993).

The presence of microorganisms within industrial water systems results in the formation of deposits of biological origin on industrial machines. These deposits give rise to corrosion, breaks, increased down time, loss of yield, high chemical costs, odors and expensive deposit control programs. In the paper mill industry, slime deposits are reportedly responsible for nearly 70% of all breaks, blockages and pump failures. Safade, *Tackling the Slime Problem in a Paper Mill*, PTI, p. 280 (September 1988).

Slime may be defined as an "accretion or accumulation caused by certain microorganisms in the presence of pulp fiber, filler, dirt and other materials, mixed in varied proportions, having variable physical characteristics and accumulating at continuously changing rates." Id. In most industrial process waters, especially pulp and paper mill systems, spore forming bacteria and *Pseudomonas aeruginosa* contribute to slime formation. The latter is most prevalent in paper mill slimes. Fungi is also a contributor of slime formation.

The conventional method of controlling microbial growth is through the use of biocides. Biocides are generally divided into two main groups: oxidizing and non-oxidizing. These biocides act on the microorganisms in one of three ways: either by attacking the cell wall, the cytoplasmic membrane or the cellular constituents. Id. at 282.

While biocides do inhibit microbial growth, economic and environmental concerns require improved methods. A problem with the use of biocides is that high levels of expensive chemicals are needed to control microbial growth. To date, none of the commercially available biocides have exhibited a prolonged biocidal effect. Their effectiveness is rapidly reduced as a result of exposure to physical conditions such as temperature or association with ingredients contained by the system toward which they exhibit an affinity. This results in a restriction or elimination of their biocidal effectiveness.

Therefore, the use of such biocides involves continuous or frequent additions to paper mill systems. Further, these additions must be made at a plurality of points or zones in the system. The costs of the biocides and the labor costs involved are considerable.

Moreover, such chemicals are highly toxic in the quantities known to be required for effective control of microbial populations. As a result, environmental regulations restrict the amount of biocides that can safely be discarded into the environment. Therefore, a need exists for improved methods for controlling the growth of microorganisms in industrial process waters.

SUMMARY OF THE INVENTION

Pursuant to the present invention, the growth of microorganisms can be inhibited without the use of high levels of certain organic peroxide biocides such as peracetic acid and other peracids. The present invention provides compositions to be used for controlling the growth of microorganisms in industrial process waters. The compositions include sufficient amounts of a peracetic acid and a non-oxidizing biocide.

The present invention also provides a method for inhibiting the growth of the microorganisms in industrial process waters. Preferably, these process waters may be selected from the group consisting of pulp and paper mill process waters, industrial cooling waters and mining waters. The method includes the step of adding to the waters sufficient amounts of a peracetic acid (PAA) and a non-oxidizing biocide. Combining the peracetic acid with the non-oxidizing biocide has been found to enhance the effectiveness of the non-oxidizing biocide.

DETAILED DESCRIPTION OF THE INVENTION

The present invention provides, under one embodiment for inhibiting the growth of microorganisms, wherein the microorganisms may contain bacteria or fungi, improved peracetic acid compositions and a method of administering the same to a fluid system. The compositions include a sufficient amount of a peracetic acid and a non-oxidizing biocide.

The biocide component of this invention includes biocides that exhibit a synergistic effect when added to a fluid stream with a peracetic acid. Examples of suitable non-oxidizing biocides include benzisothiazolin (also known as Proxel, available from ICI), carbonimidic dibromide (also known as RH 620, available from Rohm and Haas), 1,4-Bis (bromoacetoxy)-2-butene (also known as Busan 1210, available from Buckman Laboratories) and β-bromo-β-nitrostyrene (also known as BNS, available from Midwest Research Institute). Mixtures of such biocides are also contemplated within the claims of the invention.

Peracetic acid may also be obtained from a number of chemical suppliers. One such supplier is FMC Corporation of Philadelphia, Pa.

The combination of a peracetic acid along with such non-oxidizing biocides provides an unexpected synergistic relationship. The synergistic relationship is present in that the cooperative action of the combined peracetic acid with the non-oxidizing biocides yields a total effect which is greater than the sum of the effects of the biocide or the peracetic acid taken separately.

The optimal amounts of biocide and peracetic acid required for effectiveness in this invention depend on the type of industrial waters being treated. In addition, the concentration of the combined components varies greatly and can depend upon the conditions such as temperature and pH of the waters, and the microbial count. The concentrations may be as little as 1 part per million (ppm) by weight to as much as 250 ppm. With respect to the biocide, the lower and upper limits of the required concentration substantially depend upon the specific biocide or combination of biocides used. In a preferred embodiment of the present invention, the composition will comprise from about 10 to about 250 ppm of peracetic acid and from about 1 to about 250 ppm of a non-oxidizing biocide.

Still further, since the suitable biocides that may be used in the present invention are often obtained at different usable concentrations (i.e. activity level), the ratios vary depending on the particular biocide combined with the peracetic acid.

By way of example, and not limitation, the following are biocides, including the percent active of each biocide, that may be used in the present invention: benzisothiazolin (17% a.i.), carbonimidic dibromide (100% a.i.), 1,4-Bis (bromoacetoxy)-2-butene (80% a.i.) and β-bromo-β-nitrostyrene (100% a.i.), wherein "a.i." represents active ingredient.

Pursuant to the method of the present invention, the growth of microorganisms can be inhibited in industrial process water, such as the water of a pulp and paper mill system, cooling water and mining water. The method comprises the step of adding to the water the peracetic acid and the nonoxidizing biocide of the present invention. In one embodiment, the biocide and the peracetic acid are separate components that are added to the system. Preferably, the peracetic acid and the non-oxidizing biocide are added in a ratio from about 250:1 to about 1:25.

In a preferred embodiment, the peracetic acid is added to the industrial water prior to the addition of the non-oxidizing biocide. The peracetic acid can be added pursuant to any known method that provides the desired concentration of the same in the waters.

After the controlled addition of the peracetic acid, the non-oxidizing biocide is then added to the water system. In an embodiment, the non-oxidizing biocide is added 30 minutes after the peracetic acid is added to the system. Similar to the peracetic acid addition, the biocide can be added pursuant to any known method that provides the desired concentration of the biocide in the water.

In an embodiment, the method comprises adding from about 10 to about 250 ppm of the peracetic acid and from about 1 to about 250 ppm of the non-oxidizing biocide. In an embodiment, the biocide and the peracetic acid are present in a range from about 1 ppm to 1000 ppm of product.

Peracetic acid is a unique oxidant, utilizing a different mode of action than other oxidants. Given the structure of the molecule:

the hydrocarbon tail allows PAA to penetrate into the bacterial cell. This enables the molecule to disrupt S—S and S—H bonds both inside and outside of the organisms, killing more quickly and effectively than other oxidants. Other oxidants, such as $HOCl$, $ClO_2$, $H_2O_2$, etc. do not penetrate the cells in this manner because they do not have an organic portion to facilitate entrance into the bacterial cell.

Peracetic acid has always been applied by itself in high concentrations. Because it is also an equilibrium molecule, in that it dissociates back to its starting product after it is diluted, it was never expected to be active at low concentrations. However, its dissociation rate is much slower than expected, giving an unexpected synergy with other biocides when it is applied at low concentrations (as low as 10 ppm of a 5% product or 0.5 ppm active).

Peracetic acid has been used as a sterilant in the food industry for many years, but is generally used at higher concentrations (10,000 to 100,000 ppm). Until recently it has not been used in the paper industry for the control of microorganisms in the papermachine process water.

An advantage of the present invention is that it lowers the level of expensive chemicals needed for inhibiting the growth of microorganisms. With the addition of a peracetic acid in the water system, the non-oxidizing biocide is effective in low dosages and, as a result, is long lasting as evidenced by reductions in microbial grow back. The increased effectiveness removes the need for repetitive additions of the biocide at multiple points in the papermaking system.

A further advantage of the present invention is that it provides a more cost effective and environmentally friendly method for treating microorganisms.

EXAMPLES

The following examples are intended to be illustrative of the present invention and to teach one of ordinary skill how to make and use the invention. These examples are not intended to limit the invention or its protection in any way. The examples illustrate the synergistic relationship obtained with the compositions of the present invention.

Synergy is mathematically demonstrated by the industry accepted method described by S. C. Kull et al. in *Allied Microbiology*, vol. 9, pages 538–541 (1961). As applied to this invention, it is as follows:

$Q_A$=the ppm of active peracetic acid alone which produces an endpoint.

$Q_B$=the ppm of active non-oxidizing biocide alone which produces an endpoint.

$Q_a$=the ppm of active peracetic acid, in combination with non-oxidizing biocide, which produces an endpoint.

$Q_b$=the ppm of active non-oxidizing biocide, in combination, which produces an endpoint.

$Q_a/Q_A+Q_b/Q_B$=Synergy Index

Synergy index is

<1, it indicates synergy

=1, it indicates additivity

>1, it indicates antagonism

The following test procedures were utilized during the experimentation of the present invention.

Process water from several paper mills was obtained for test purposes. Aliquots of water from each mill were dosed with the indicated concentrations of peracetic acid (5% active obtained from FMC). After 30 minutes of contact time, the designated concentrations of non-oxidizing biocide were added to the aliquots previously dosed with PAA, mixed well and incubated at 37° C. in an orbital shaker. At the designated contact times, each aliquot was sampled to determine the total number of viable organisms in colony forming units per milliliter (CFU/mL) on Tryptone Glucose Extract (TGE) agar. An endpoint of 2, 3, 4 or 5 $\log_{10}$ reduction in viable organisms was then selected for calculating synergy.

Example 1

Synergistic activity of peracetic acid and benzisothiazolin, also know as Proxel, against microorganisms in a papermill process water, pH 7.2, is shown in the following data.

| Biocide (ppm of product) | 5 Hour Contact | 24 Hour Contact |
| --- | --- | --- |
| PAA @ 12.5 ppm | $1.6 \times 10^6$ CFU/mL | $3.9 \times 10^7$ CFU/mL |
| PAA @ 25 ppm | $2.5 \times 10^5$ CFU/mL | $5.1 \times 10^7$ CFU/mL |
| PAA @ 50 ppm | $4.2 \times 10^4$ CFU/mL | $3.2 \times 10^6$ CFU/mL |
| PAA @ 100 ppm | $3.0 \times 10^3$ CFU/mL | $4.0 \times 10^3$ CFU/mL |
| Proxel @ 25 ppm | $1.0 \times 10^7$ CFU/mL | $1.1 \times 10^6$ CFU/mL |
| Proxel @ 50 ppm | $8.3 \times 10^6$ CFU/mL | $4.8 \times 10^5$ CFU/mL |
| Proxel @ 100 ppm | $6.3 \times 10^6$ CFU/mL | $9.0 \times 10^4$ CFU/mL |
| Proxel @ 200 ppm | $4.3 \times 10^6$ CFU/mL | $9.0 \times 10^4$ CFU/mL |
| PAA @ 10 ppm plus | | |
| Proxel @ 25 ppm | $2.1 \times 10^6$ CFU/mL | $7.0 \times 10^5$ CFU/mL |
| Proxel @ 50 ppm | $2.7 \times 10^6$ CFU/mL | $2.2 \times 10^4$ CFU/mL |
| Proxel @ 100 ppm | $2.8 \times 10^6$ CFU/mL | $9.0 \times 10^4$ CFU/mL |
| Proxel @ 200 ppm | $1.8 \times 10^6$ CFU/mL | $8.0 \times 10^3$ CFU/mL |
| PAA @ 20 ppm plus | | |
| Proxel @ 25 ppm | $6.2 \times 10^5$ CFU/mL | $6.2 \times 10^4$ CFU/mL |
| Proxel @ 50 ppm | $5.4 \times 10^5$ CFU/mL | $7.4 \times 10^4$ CFU/mL |
| Proxel @ 100 ppm | $7.1 \times 10^5$ CFU/mL | $2.7 \times 10^4$ CFU/mL |
| Proxel @ 200 ppm | $9.6 \times 10^5$ CFU/mL | $3.8 \times 10^4$ CFU/mL |
| PAA @ 40 ppm plus | | |
| Proxel @ 25 ppm | $1.8 \times 10^5$ CFU/mL | $1.9 \times 10^4$ CFU/mL |
| Proxel @ 50 ppm | $1.1 \times 10^5$ CFU/mL | $<10^3$ CFU/mL |
| Proxel @ 100 ppm | $2.6 \times 10^5$ CFU/mL | $<10^3$ CFU/mL |
| Proxel @ 200 ppm | $7.4 \times 10^4$ CFU/mL | $<10^3$ CFU/mL |
| Control | $1.4 \times 10^7$ CFU/mL | $1.2 \times 10^7$ CFU/mL |

Synergy Calculation:
After 24 hours of contact, a 3 $\log_{10}$ or greater reduction was achieved with:
PAA = 100 ppm
Proxel = 100 ppm
PAA = 20 ppm/Proxel = 25 ppm
SI = 20/100 + 25/100 = 0.45

Example 2

Synergistic activity of peracetic acid and carbonimidic dibromide, also known as RH 620, against microorganisms in a papermill process water, pH 7.5, is shown in the following data.

| Biocide (ppm of product) | 4 Hour Contact | 24 Hour Contact |
| --- | --- | --- |
| PAA @ 12.5 ppm | $5.4 \times 10^6$ CFU/mL | $2.8 \times 10^7$ CFU/mL |
| PAA @ 25 ppm | $2.1 \times 10^4$ CFU/mL | $7.1 \times 10^6$ CFU/mL |
| PAA @ 50 ppm | $<10^3$ CFU/mL | $<10^3$ CFU/mL |
| RH 620 @ 25 ppm | $5.3 \times 10^6$ CFU/mL | $2.6 \times 10^7$ CFU/mL |
| RH 620 @ 50 ppm | $1.5 \times 10^6$ CFU/mL | $2.7 \times 10^7$ CFU/mL |
| RH 620 @ 100 ppm | $4.0 \times 10^5$ CFU/mL | $5.6 \times 10^6$ CFU/mL |
| RH 620 @ 200 ppm | $4.1 \times 10^4$ CFU/mL | $<10^3$ CFU/mL |

| Biocide (ppm of product) | 4 Hour Contact | 24 Hour Contact |
| --- | --- | --- |
| PAA @ 10 ppm plus | | |
| RH 620 @ 25 ppm | $8.6 \times 10^5$ CFU/mL | $2.7 \times 10^7$ CFU/mL |
| RH 620 @ 50 ppm | $6.0 \times 10^5$ CFU/mL | $2.0 \times 10^7$ CFU/mL |
| RH 620 @ 100 ppm | $1.5 \times 10^5$ CFU/mL | $5.0 \times 10^3$ CFU/mL |
| RH 620 @ 200 ppm | $<10^3$ CFU/mL | $<10^3$ CFU/mL |
| PAA @ 20 ppm plus | | |
| RH 620 @ 25 ppm | $1.8 \times 10^5$ CFU/mL | $2.1 \times 10^7$ CFU/mL |
| RH 620 @ 50 ppm | $1.4 \times 10^5$ CFU/mL | $1.7 \times 10^6$ CFU/mL |
| RH 620 @ 100 ppm | $3.4 \times 10^4$ CFU/mL | $<10^3$ CFU/mL |
| RH 620 @ 200 ppm | $<10^3$ CFU/mL | $<10^3$ CFU/mL |
| Control | $4.4 \times 10^6$ CFU/mL | $1.2 \times 10^7$ CFU/mL |

Synergy Calculation:
After 24 hours of contact, a 3 $\log_{10}$ or greater reduction was achieved with:
PAA = 50 ppm
RH 620 = 200 ppm
PAA = 10 ppm/RH 620 = 100 ppm
SI = 10/50 + 100/200 = 0.70

Example 3

Synergistic activity of peracetic acid and 1,4-Bis (bromoacetoxy)-2-butene (BBB), also known as Busan 1210, against microorganisms in a papermill process water, pH 7.4, is shown in the following data.

| Biocide (ppm of product) | 5 Hour Contact | 24 Hour Contact |
| --- | --- | --- |
| PAA @ 12.5 ppm | $6.0 \times 10^5$ CFU/mL | $6.6 \times 10^6$ CFU/mL |
| PAA @ 25 ppm | $1.7 \times 10^4$ CFU/mL | $1.0 \times 10^6$ CFU/mL |
| PAA @ 50 ppm | $<10^3$ CFU/mL | $8.1 \times 10^5$ CFU/mL |
| PAA @ 100 ppm | $<10^3$ CFU/mL | $<10^3$ CFU/mL |
| BBB @ 12.5 ppm | $1.5 \times 10^6$ CFU/mL | $5.0 \times 10^6$ CFU/mL |
| BBB @ 25 ppm | $5.6 \times 10^5$ CFU/mL | $4.2 \times 10^6$ CFU/mL |
| BBB @ 50 ppm | $1.8 \times 10^5$ CFU/mL | $5.1 \times 10^6$ CFU/mL |
| BBB @ 100 ppm | $1.4 \times 10^5$ CFU/mL | $2.9 \times 10^6$ CFU/mL |
| PAA @ 20 ppm plus | | |
| BBB @ 12.5 ppm | $1.0 \times 10^4$ CFU/mL | $1.0 \times 10^6$ CFU/mL |
| BBB @ 25 ppm | $7.0 \times 10^3$ CFU/mL | $4.2 \times 10^5$ CFU/mL |
| BBB @ 50 ppm | $<10^3$ CFU/mL | $3.1 \times 10^4$ CFU/mL |
| BBB @ 100 ppm | $<10^3$ CFU/mL | $<10^3$ CFU/mL |
| PAA @ 40 ppm plus | | |
| BBB @ 12.5 ppm | $<10^3$ CFU/mL | $4.0 \times 10^3$ CFU/mL |
| BBB @ 25 ppm | $<10^3$ CFU/mL | $<10^3$ CFU/mL |
| BBB @ 50 ppm | $<10^3$ CFU/mL | $<10^3$ CFU/mL |
| BBB @ 100 ppm | $<10^3$ CFU/mL | $<10^3$ CFU/mL |
| Control | $2.8 \times 10^6$ CFU/mL | $3.6 \times 10^6$ CFU/mL |

Synergy Calculation:
After 24 hours of contact, a 3 $\log_{10}$ or greater reduction was achieved with:
PAA = 100 ppm
BBB = >100 ppm (200)
PAA = 40 ppm/BBB = 12.5 ppm
SI = 40/100 + 12.5/200 = 0.4625

Example 4

Synergistic activity of peracetic acid and β-bromo-β-nitrostyrene, also known as BNS, against microorganisms in a papermill process water, pH 7.2, is shown in the following data.

| Biocide | 4 Hour Contact | 24 Hour Contact |
| --- | --- | --- |
| PAA @ 12.5 ppm product | $1.3 \times 10^7$ CFU/mL | $1.7 \times 10^7$ CFU/mL |
| PAA @ 25 ppm product | $3.53 \times 10^6$ CFU/mL | $1.4 \times 10^7$ CFU/mL |
| PAA @ 50 ppm product | $1.5 \times 10^6$ CFU/mL | $7.2 \times 10^6$ CFU/mL |

-continued

| Biocide | 4 Hour Contact | 24 Hour Contact |
|---|---|---|
| PAA @ 100 ppm product | $2.0 \times 10^4$ CFU/mL | $6.8 \times 10^4$ CFU/mL |
| BNS @ 1.0 ppm a.i. | $7.5 \times 10^6$ CFU/mL | $1.1 \times 10^6$ CFU/mL |
| BNS @ 2.0 ppm a.i. | $6.8 \times 10^6$ CFU/mL | $4.8 \times 10^6$ CFU/mL |
| BNS @ 4.0 ppm a.i. | $5.8 \times 10^6$ CFU/mL | $9.0 \times 10^6$ CFU/mL |
| BNS @ 8.0 ppm a.i. | $3.4 \times 10^6$ CFU/mL | $2.7 \times 10^4$ CFU/mL |
| PAA @ 20 ppm plus | | |
| BNS @ 1.0 ppm a.i. | $4.7 \times 10^6$ CFU/mL | $6.5 \times 10^6$ CFU/mL |
| BNS @ 2.0 ppm a.i. | $3.7 \times 10^6$ CFU/mL | $3.2 \times 10^6$ CFU/mL |
| BNS @ 4.0 ppm a.i. | $2.7 \times 10^6$ CFU/mL | $3.8 \times 10^5$ CFU/mL |
| BNS @ 8.0 ppm a.i. | $8.6 \times 10^5$ CFU/mL | $3.1 \times 10^4$ CFU/mL |
| PAA @ 40 ppm plus | | |
| BNS @ 1.0 ppm a.i. | $1.6 \times 10^6$ CFU/mL | $1.7 \times 10^6$ CFU/mL |
| BNS @ 2.0 ppm a.i. | $1.5 \times 10^6$ CFU/mL | $1.8 \times 10^5$ CFU/mL |
| BNS @ 4.0 ppm a.i. | $6.7 \times 10^5$ CFU/mL | $3.0 \times 10^3$ CFU/mL |
| BNS @ 8.0 ppm a.i. | $2.3 \times 10^5$ CFU/mL | $4.0 \times 10^3$ CFU/mL |
| Control | $1.4 \times 10^7$ CFU/mL | $1.2 \times 10^7$ CFU/mL |

Synergy Calculation:
After 24 hours of contact, a 4 $\log_{10}$ or greater reduction was achieved with:
PAA = >100 ppm product (200 ppm)
BNS = >8 ppm a.i. (16 ppm)
PAA = 40 ppm/BNS = 4 ppm
SI = 40/200 + 4/16 = 0.45

While the present invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

What is claimed is:

1. A composition for inhibiting the growth of microorganisms comprising effective amounts of peracetic acid and a non-oxidizing biocide selected from the group consisting of benzisothiazolin, carbonimidic dibromide, 1,4-Bis(bromoacetoxy)-2-butene and β-bromo-β-nitrostyrene.

2. The composition of claim 1 wherein the amount of peracetic acid ranges from about 10 to about 250 ppm and the amount of the non-oxidizing biocide ranges from about 1 to about 250 ppm.

3. A method for controlling the growth of microorganisms in industrial process water comprising the step of administering a sufficient amount of peracetic acid and a sufficient amount of a non-oxidizing biocide selected from the group consisting of benzisothiazolin, carbonimidic dibromide, 1,4-Bis(bromoacetoxy)-2-butene and β-bromo-β-nitrostyrene to the industrial process water to inhibit the growth of the microorganisms.

4. The method of claim 3 wherein the industrial process water is selected from the group consisting of water of a pulp and paper mill system, cooling water and mining water.

5. The method of claim 3 wherein the peracetic acid and the non-oxidizing biocide are added in a ratio from about 250:1 to about 1:25.

6. The method of claim 3 wherein the amount of peracetic acid added ranges from about 10 to about 250 ppm and the amount of the non-oxidizing biocide ranges from about 1 to about 250 ppm.

7. The method of claim 3 wherein the microorganisms contain bacteria.

8. The method of claim 3 wherein the microorganisms contain fungi.

9. The method of claim 3 wherein the peracetic acid is added to the industrial water prior to the addition of the non-oxidizing biocide.

* * * * *